United States Patent [19]
Kazecki et al.

[11] Patent Number: 5,058,136
[45] Date of Patent: Oct. 15, 1991

[54] COHERENT DETECTION FOR QPSK MODULATION

[75] Inventors: Henry L. Kazecki, Arlington Heights; Donald W. Dennis, Schaumburg; Steven H. Goode, Barrington, all of Ill.

[73] Assignee: Motorola, Inc., Schaumburg, Ill.

[21] Appl. No.: 628,977

[22] Filed: Dec. 17, 1990

[51] Int. Cl.⁵ .............................................. H04L 27/22
[52] U.S. Cl. ........................................ 375/86; 329/306
[58] Field of Search ............... 375/77, 81, 83, 85, 375/97, 120, 80, 86; 455/208, 258, 265; 329/304, 306, 307

[56] References Cited
U.S. PATENT DOCUMENTS

| | | | |
|---|---|---|---|
| 3,818,347 | 6/1974 | Holsinger | 375/81 |
| 4,361,894 | 11/1982 | Kurihara et al. | 375/80 |
| 4,843,616 | 6/1989 | Hoffmann | 375/97 |
| 4,853,943 | 8/1989 | Laws | 375/81 |
| 4,871,973 | 10/1989 | Yoshihara | 375/81 |

Primary Examiner—Stephen Chin
Attorney, Agent, or Firm—Kenneth W. Bolvin

[57] ABSTRACT

The $\pi/4$-QPSK coherent detector of the present invention has a vector input and an output comprising recovered data in bit pair form. The $\pi/4$-QPSK coherent detector recovers data that has been encoded in an amplitude modulated vector's phase angle. The $\pi/4$-QPSK coherent detector detects the $\pi/4$-QPSK constellation of the incoming modulated signal and outputs the recovered data stream.

12 Claims, 2 Drawing Sheets

COHERENT DETECTION FOR QPSK MODULATION

FIELD OF THE INVENTION

The present invention relates generally to the field of communications and particularly to coherent detection in a digital communication environment.

BACKGROUND OF THE INVENTION

Any modulation method can be represented by a constellation. An example of this is the eight point constellation illustrated in FIG. 3. This constellation is generated from differentially encoded QPSK (DEQPSK or π/4 QPSK) which is a subset of the four state QPSK constellation. Each state is characterized by a vector having the same magnitude, but a different phase angle. Due to the differential encoding of the QPSK signal to generate the π/4-QPSK signal, data recovery may be accomplished with either a coherent or non-coherent detector. Coherent detection exhibits better performance in some situations as compared to non-coherent detection techniques.

In coherent detection, however, the carrier phase must be recovered from the received signal. Also, with π/4-QPSK a known initial 0°/45° rotation phase is required as a start-up condition. This is required to determine the initial constellation point of the QPSK constellation. Additionally, environmental fading can rotate the constellation points causing random phase modulation. There is a resulting need for a coherent detector that can determine the initial constellation point rapidly and track the rotating constellation.

SUMMARY OF THE INVENTION

The π/4-QPSK coherent detector of the present invention has a vector input and an output comprising recovered data in bit pair form. The coherent detector comprises the input vector coupled to an input of a mixer. The output of the mixer is coupled to an input of a unit vector limiter. The output of the limiter is coupled to a phase detector for generating a phase error signal and determining the phase angle of the input vector. The phase detector has an output coupled to a loop filter, for limiting noise on the phase error signal. The output of the loop filter drives a numerically controlled oscillator that in turn outputs an oscillator signal that is mixed with the input vector. The differential decoder uses the angle from the phase detector to determine the bit pair corresponding to the angle. The bit pair is the output of the present invention.

DETAILED DESCRIPTION OF THE PREFERRED EMBODIMENT

Figure 3:
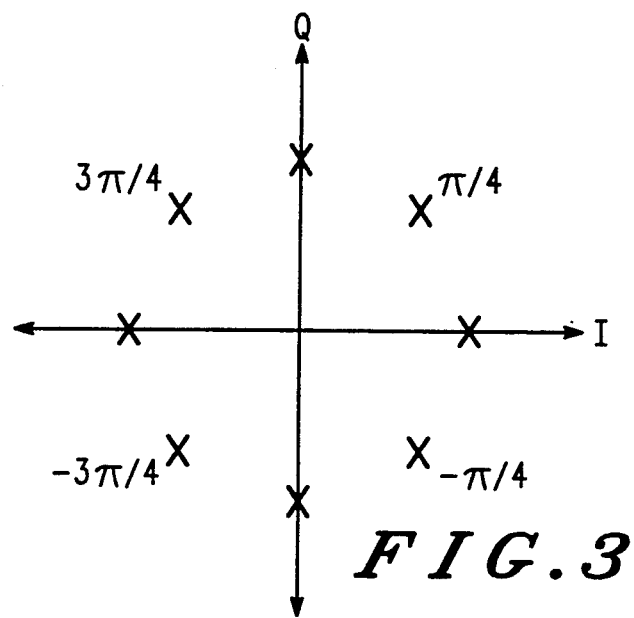
FIG. 3 shows the π/4-QPSK constellation of the present invention.

The π/4-QPSK coherent detector of the present invention enables recovery of data that has been encoded in an amplitude and phase modulated vector. The π/4-QPSK coherent detector detects the π/4-QPSK constellation, illustrated in FIG. 3, of an incoming signal and outputs the recovered data stream.

Figure 1:
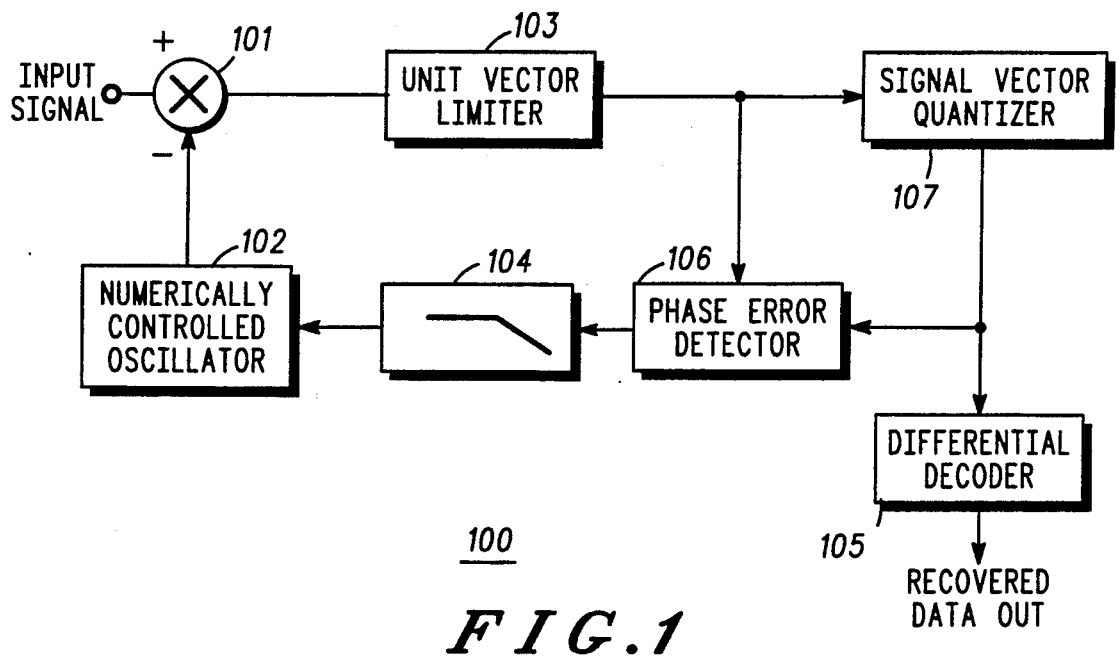
FIG. 1 shows the preferred embodiment of the present invention.

The received modulated signal is input to the π/4-QPSK coherent detector (100) of the present invention, illustrated in FIG. 1, where it is first multiplied (101) with a signal from a numerically controlled oscillator (NCO) (102). The vector output from this mixer is next limited in length to unity (103). Since the data to be recovered is encoded in the vector's angle, the length of the vector is not important. For generalized vector modulated signals, for example QAM, the unit vector limiter (UVL) (103) is used in the coherent carrier recovery block to remove the amplitude modulation. The signal before the UVL (103) is applied to a data recovery block where both the amplitude and phase information is preserved for proper data recovery operation. If the vector is not limited to unity, an undesirable term representing the AM component will appear later in the coherent detector. The limiter operation is accomplished using the following equation:

$$\text{Unit vector} = \frac{V}{\sqrt{I^2 + Q^2}}$$

where V is the vector with AM and I and Q are the ordinate and abscissa components of V. Also, other techniques can be used to perform the unit vector limiter. For example, the arctangent function can be used to generate a UVL signal.

Figure 2:
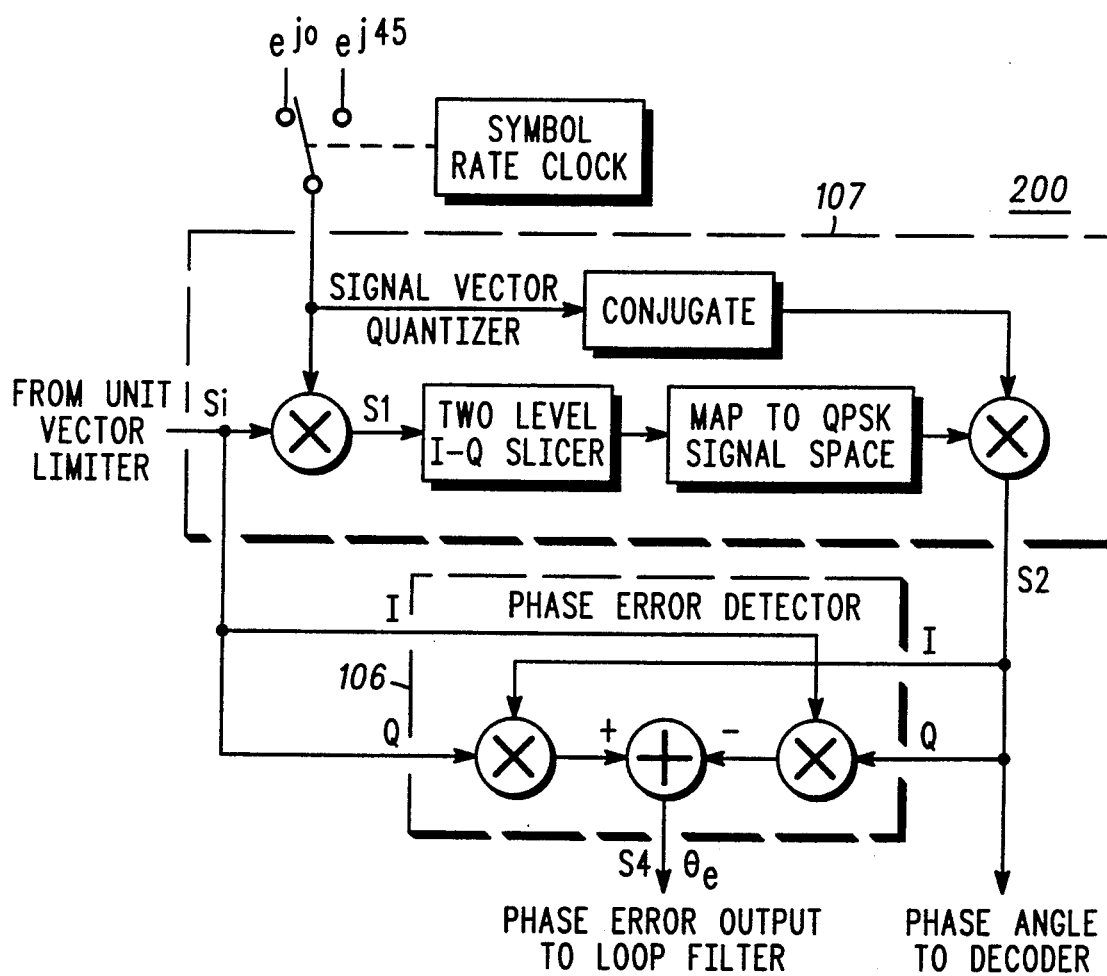
FIG. 2 shows a block diagram of the decision directed phase detector of the present invention.

The unit vector is next input to a phase error detector (106), illustrated in FIG. 1, for generating a phase error signal, $\theta_e$ and a signal vector quantizer (107) for determining the phase angle of the input vector. FIG. 2 illustrates an expanded view of the phase error detector (106) and the signal vector quantizer (107). $\theta_e$ is the difference between the received input vector angle and the closest point on the π/4-QPSK constellation.

$\theta_e$ is derived from the eight point π/4-QPSK signal constellation. This derivation, in conjunction with FIG. 2, is as follows:

$$s_i = p(t)e^{j(\theta n(t) + \Delta\theta e)}$$

$$s_2 = e^{j\theta n(t)}$$

and $$s_4 = Im\, s_i \times s_2{}^x = \sin \Delta\theta e$$

$s_4 \approx \Delta\theta_e$ if $\Delta\theta_e << 1$ radian since $\sin \theta \approx \theta$ for $\theta << 1$ radian.

The phase error detector (106) mixes the Q component from the signal vector quantizer (107) output with the I component from the phase error detector (106) input and subtracts the result from the product of the I component from the signal vector quantizer (107) and the Q component of the phase error detector (106) input.

Figure 4:
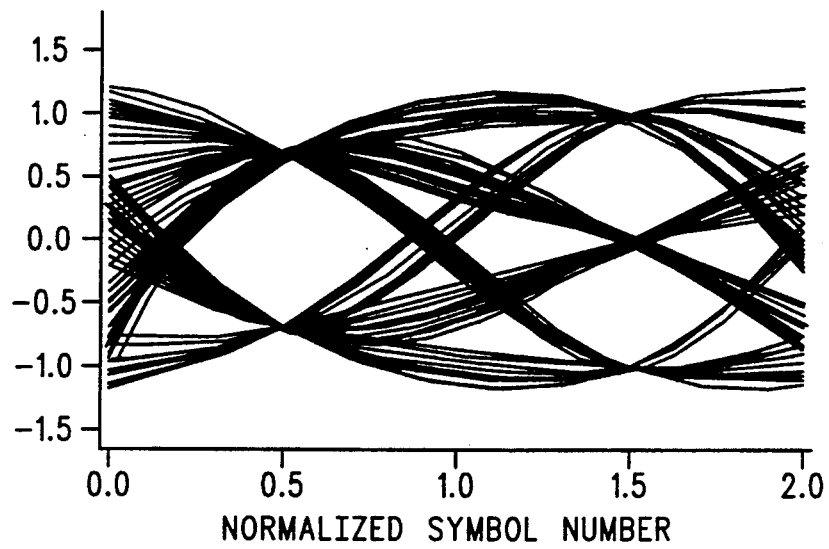
FIG. 4 shows the 5-level eye produced by the π/4-QPSK coherent detector of the present invention.

The signal vector quantizer is derived by observing the possible states of the π/4-QPSK waveform, it is seen that there is an alternating pattern between the axis states and the π/4 off-axis states. The axis states are represented by a vector of modulus 1 with possible angles of 0, π/2, π, and −π/2 degrees and the off-axis states are represented by a vector of modulus 1 with possible angels of ±π/4 and ±3π/4. A 5-level eye, illustrated in FIG. 4, is produced by projecting the vector to the I and Q axis.

The desired data is recovered from this 5-level signal by performing a slice operation and differential decoding to translate the 5-levels into the appropriate binary data. This mapping is commonly referred to as Gray encoding the nonreturn to zero (NRZ) binary data to the I&Q signal space constellation. Other methods of mapping can also be used for this purpose. A simple 5-level slicing operation will have poor performance due to small differences between decision levels in the data slicer. An optimal signal vector quantizing operation is derived by noting that the 5-level baseband eyes alternate between 3 and 2 levels at every other symbol time. This is the result of differential encoding which is performed on the QPSK constellation to generate the $\pi/4$-QPSK signal. At every symbol time the new constellation point is generated by a phase shift of $\pm\pi/4$ or $\pm 3\pi/4$ from the previous 8-point constellation point.

Due to differential encoding, once an initial start-up phase point is known, the 3 and 2-level flip-flop pattern is defined. Also, the 3-level eye can be mapped to a 2-level eye by performing a 45° complex phase shift at the receiver. The 3-level eye is produced by the on-axis constellation points. The noise immunity improvement is due to doing a 2-level slicer operation at the 3-level points of the eye. This is accomplished by rotating the received vector 45°, thus generating a 2-level eye to slice without SNR penalty.

The difficulty in terms of implementation is in determining the initial constellation point of the baseband recovered constellation. Finding the initial phase for optimal coherent operation implies extra processing for a DSP based detector. The initial phase is a function of phase offsets between the transmitter and the receiver local oscillator frequency. Random phase modulation due to environmental fading also rotates the constellation points.

A start-up problem can occur if the initial point chosen is off by 45°. This problem is solved by the data directed phase detector. When a wrong 0°/45° rotation decision is made, the phase error term will be large. This large phase error will cause the digital phase locked loop (DPLL) to shift the NCO phase which will shift the output such that the signal into the phase detector will have the proper phase for the chosen initial 0°/45° rotation phase. The phase detector of the present invention, therefore, enables self-recovery of initial errors.

The coherent carrier tracking is accomplished with the DPLL approach. The NCO (102) generates the coherent carrier driven by an error signal derived from the QPSK signal constellation. This error signal is related to phase drift caused by channel Doppler fading distortion and local oscillator frequency differences. Random phase modulation due to environmental fading rotates these constellation points. The coherent detector, therefore, must track the phase drift caused by the fading.

The phase error is filtered by a second order loop filter (104) having a bandwidth of 500 Hz. The filter limits the noise on this signal. The filtered phase error output drives the NCO (102).

The coherently recovered signal vector is input to a differential decoder (105) to determine the corresponding bit pair associated with the angle. This is accomplished by finding the angle in the look-up table and determining the corresponding bit pair for output from the present invention:

| Data | $\theta$ |
| --- | --- |
| 00 | $3\pi/4$ |
| 01 | $\pi/4$ |
| 10 | $-\pi/4$ |
| 11 | $-3\pi/4$ |

While the coherent detector (100) of the present invention has been described as a $\pi/4$-QPSK detector, it will also work for any QPSK scheme. A continuous stream of symbols, however, is required for proper operation. These symbols do not have to be intended for a particular receiver, they can be data intended for another receiver but picked up by all receivers.

We claim:

1. A coherent detector apparatus having a vector input that has been data modulated and a recovered data output, the apparatus comprising:
    a) multiplying means having an output and a first and second input, the vector input coupled to the first input;
    b) vector limiting means, coupled to the output of the multiplying means, for limiting the vector input to unity;
    c) signal vector quantizing means, coupled to the output of the vector limiting means, for generating a quantized received signal vector;
    d) phase error detection means, coupled to the vector limiting means and the signal vector quantizing means, for generating a phase error signal;
    e) controllable oscillator means, having an input coupled to the phase error detection means and an output coupled to the second input of the multiplying means, the controllable oscillator means generating a variable frequency signal in response to the phase error signal; and
    f) decoding means, having an input coupled to the signal vector quantizing means and an output coupled to the recovered data output, for decoding the quantized received signal vector into data bits.

2. The apparatus of claim 1 and further including filtering means coupling the controllable oscillator means to the phase error detection means.

3. The apparatus of claim 1 wherein the controllable oscillator means is a numerically controlled oscillator.

4. The apparatus of claim 1 wherein the coherent detector apparatus is a $\pi/4$-QPSK coherent detection apparatus.

5. A coherent detector apparatus having a vector input that has been data modulated and a recovered data output, the apparatus comprising:
    a) mixing means, having an output and an input of the means coupled to the vector input, for mixing a plurality of signals;
    b) vector limiting means, coupled to the output of the mixing means, for limiting the vector input to unity;
    c) signal vector quantizing means, coupled to the vector limiting means, for generating a quantized received signal vector;
    d) phase error detection means, coupled to the vector limiting means and the signal vector quantizing means, for generating a phase error signal;

e) filtering means coupled to the phase error detection means, for producing a filtered phase error signal;

f) controllable oscillator means, having an input coupled to the filtering means and an output coupled to the mixing means, the controllable oscillator means generating a variable frequency signal in response to the filtered phase error signal; and g) decoding means, having an input coupled to the signal vector quantizing means and an output coupled to the recovered data output, for decoding the quantized received signal vector into data bits.

6. The apparatus of claim 5 wherein the controllable oscillator means is a numerically controlled oscillator.

7. The apparatus of claim 5 wherein the coherent detector apparatus is a $\pi/4$-QPSK coherent detection apparatus.

8. A method of coherent detection for detecting a data modulated input vector, the input vector having a variable length, and converting the input vector to a bit stream of data, the method comprising the steps of:

a) multiplying an oscillating signal with the input vector to form a mixed input vector;

b) limiting the length of the mixed input vector to unit length;

c) generating a phase error signal and a vector quantized signal from the unit length mixed input vector;

d) filtering the phase error signal to generate a filtered phase error signal;

e) controlling oscillating means with the filtered phase error signal to form the oscillating signal, the oscillating signal changing frequency in response to the phase error signal;

f) decoding the vector quantized signal to form the bit stream of data; and g) repeating from step a.

9. A coherent detector apparatus having a vector input that has been data modulated and a recovered data output, the apparatus comprising:

a) mixing means, having an output and an input of the means coupled to the vector input, for mixing a plurality of signals;

b) vector limiting means, coupled to the output of the multiplying means, for limiting the vector input to unity;

c) signal vector quantizing means, coupled to the vector limiting means, for generating a quantized received signal vector;

d) phase error detection means, coupled to the vector limiting means and the signal vector quantizing means, for generating a phase error signal;

e) filtering means coupled to the phase error detection means, for producing a filtered phase error signal;

f) controllable oscillator means, having an input coupled to the filtering means and an output coupled to the mixing means, the controllable oscillator means generating a variable frequency signal in response to the filtered phase error signal; and g) decoding means, having an input coupled to the signal vector quantizing means and an output coupled to the recovered data output, for decoding the quantized received signal vector into data bits.

10. The apparatus of claim 9 wherein the controllable oscillator means is a numerically controlled oscillator.

11. The apparatus of claim 9 wherein the coherent detector apparatus is a QAM coherent detection apparatus.

12. A method of coherent detection for detecting a data modulated input vector, the input vector having a variable length, and converting the input vector to a bit stream of data, the method comprising the steps of:

a) multiplying an oscillating signal with the input vector to form a mixed input vector;

b) limiting the length of the mixed input vector to unit length;

c) generating a phase error signal and a vector quantized signal from the unit length mixed input vector;

d) controlling oscillating means with the phase error signal to form the oscillating signal, the oscillating signal changing frequency in response to the phase error signal;

e) decoding the vector quantized signal to form the bit stream of data; and f) repeating from step a.

* * * * *